INVENTOR.
WILFRED Y. BENSON
FREDERICK J. DESMOND

ATTORNEY 3,490,366
HAMMER MODULE WITH INTERLOCKING HAMMER GUIDES
Wilfred Y. Benson, Natick, and Frederick J. Desmond, Beverly, Mass., assignors to Mohawk Data Sciences Corporation, East Herkimer, N.Y., a corporation of New York
Filed Apr. 12, 1968, Ser. No. 720,987
Int. Cl. B41j 9/10
U.S. Cl. 101—93                          13 Claims

ABSTRACT OF THE DISCLOSURE

A print hammer assembly includes hammers, hammer guides, actuator arms and solenoids in a single, easily demountable module. The hammer guides are molded plastic inserts which are detachable from the module for ease of cleaning and replacement. The guides are provided with a plurality of locating prongs and slots whereby the guides of opposing modules interlock to accurately establish the position of the hammers along the print line. The guide prongs additionally serve as spacers for the individual hammers which achieve ballistic printing and are of simple, compact construction.

BACKGROUND OF THE INVENTION

This invention relates to print hammer modules, and more particularly, to print hammer modules for use with high speed line printers of the rotating drum or chain type. As is well known, high speed on-the-fly line printers usually employ one print hammer at each possible print position along the print line. Since the usual print position spacing is one tenth of an inch or less, it has always been a difficult problem to mount, align and accurately guide print hammers mounted on one tenth inch, or less, centers. Usually, a separate hammer guiding fixture accurately machined from a single piece of stock or fabricated as an integrated unit assembly, and requiring its own unique mounting and alignment to the basic machine frame, has been the only workable solution to satisfactory hammer packing and control. With this arrangement, proper installation of the hammer assembly in the machine requires first mounting and aligning the hammer guide fixture and hammers and then separately mounting and aligning the individual hammer actuating mechanisms with respect to the mounted hammers and hammer guide means.

It is also very common practice to provide various extensions or appendages to the hammers to enable proper hammer guiding. This adds unnecessary perplexity to the hammer construction and also adds undesirable mass as well as stress raisers to the hammer itself.

Prior art hammer mounting arrangements have further drawbacks from the standpoint of replacement of worn parts. For example, the one piece hammer guide fixture or integral assembly necessitates removal of all the hammers as well as replacement of the entire hammer guide if but one segment of the hammer guide wears out. Further, if the arrangement is of the type employing complex hammer guide appendages, disassembly of the unit for replacement of parts is likely to be a very lengthy, multi-step process requiring realignment of the entire hammer bank after the worn out parts are replaced.

By the same token, cleaning of the hammers and guides is also a lengthy and involved process.

OBJECTS AND SUMMARY OF THE INVENTION

It is therefore an object of the present invention to provide an improved hammer mounting device which reduces or lessens the above-mentioned deficiencies of prior art arrangements.

Another object is to provide an improved hammer mounting and guiding device which is attached to the basic hammer assembly module including the hammer actuating arm and solenoid whereby the entire assembly including hammer, hammer guides, actuating arm and solenoid is mountable in and detachable from correct print position by a simple two-step process.

Yet another object is to provide an improved hammer mounting device which permits high density hammer packing with very simple, low mass hammers substantially free of any guide extensions or appendages.

A further object is to provide an improved hammer mounting device which is inexpensive but accurate and which permits rapid and easy replacement of broken or worn hammers and hammer guide segments and which also permits rapid and easy cleaning of the hammer and hammer guides.

In accordance with a first aspect of the invention, a first basic hammer frame assembly is provided with a hammer guide insert including at least one locating slot and a second basic hammer frame assembly is provided with a hammer guide insert including at least one locating prong. Each basic frame includes at least one hammer together with appropriate hammer actuating means and the two frames are positioned on opposite sides of the print line such that when the locating prong of the second guide is mated with the located slot of the first guide the two hammers are exactly aligned at adjacent print positions on the print line, the locating prong functioning as a spacer between the two hammers.

In accordance with a second aspect of the invention, an additional hammer guide insert is connected with each basic hammer frame and provided with a guide groove engaging a portion of the hammer and leaving a portion thereof exposed. When two basic hammer frames are brought into operative mating engagement as discussed above, the exposed portion of the hammer guides on a surface portion of the corresponding guide insert of the opposing hammer frame assembly.

Still another aspect of the invention provides for use of the above-mentioned locating prong as a top stop to establish a limit of maximum travel for the print hammer.

These and other objects, features and advantages will be made more apparent by the following detailed description of preferred embodiments of the invention, the description being supplemented by drawings as follows:

FIG. 5 is a side elevational view taken along the line 5—5 of FIG. 4a.

FIG. 6 is a side elevational view taken along the line 6—6 of FIG. 4a.

DETAILED DESCRIPTION

Figure 2:
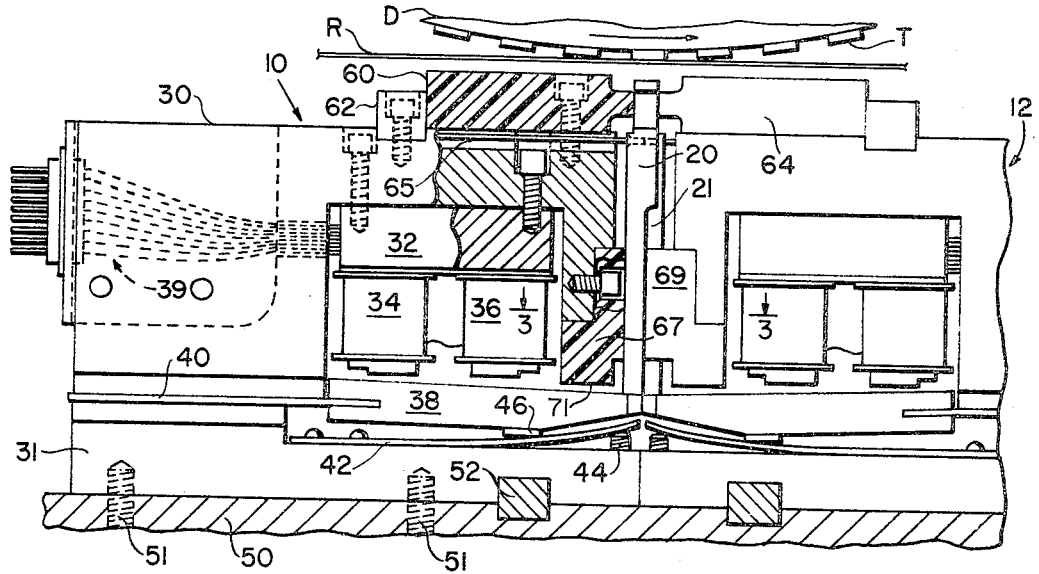
FIG. 2 is a side elevational view, partially sectioned, taken along the line 2—2 of FIG. 1.
Figure 1:
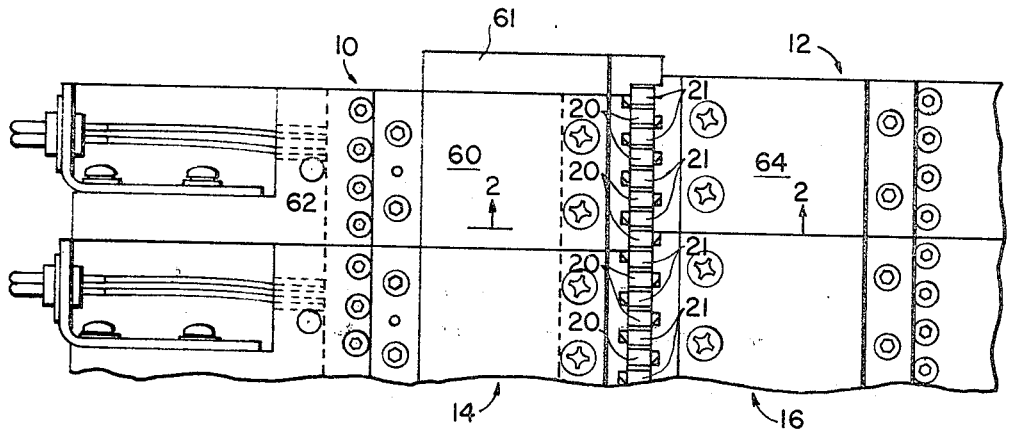
FIG. 1 is a plan view of four adjacent print hammer mounting frame assemblies cooperating to align a row of print hammers along a print line.

Referring to FIGS. 1 and 2, the construction of a first basic hammer mounting frame assembly in accordance with a preferred embodiment of the invention is hereinafter described, FIG. 1 shows a basic left-hand hammer frame assembly 10 cooperating with the adjacent assemblies 12 and 14, the latter two of which cooperate with assembly 16, to align a row of print hammers 20 and 21 in position along a print line.

As shown in FIG. 2, a print hammer 20 is adapted to force a record medium R against a rotating print drum D to generate an impression of one of the types T on the record medium. An ink ribbon (not shown) may be included between medium R and the hammer. The frame 10 comprises an upper frame member 30 and a lower member 31 which are joined together by appropriate attachment means (not shown) such as machine screws. An inverted U-shaped solenoid core 32 of magnetic material is affixed to upper frame 30 and supports about its downwardly extended legs (poles) a pair of solenoid coils 34 and 36.

Mounted below the solenoid coils is a hammer actuating arm 38 hinged to the frame assembly by a leaf spring 40 clamped between the upper and lower frames. When current is transmitted on the appropriate ones of leads 39 to energize coils 34 and 36, arm 38 is pivoted sharply upwardly to propel hammer 20 against record medium R to cause printing. After printing, when the solenoid 32–34–36 is de-energized, the bias of leaf spring 40 returns arm 38 to its home position.

An adjustable stop arm 42 establishes the home position of arm 38 and a damping pad 46 made of rubber or other resilient material is inserted between the arms 38 and 42 to reduce the rebound and noise generated by the return impact of arm 38. An adjustment screw 44 is provided to vary the vertical position of arm 42 whereby the flight time of hammer 20 may be adjusted.

Figure 5:
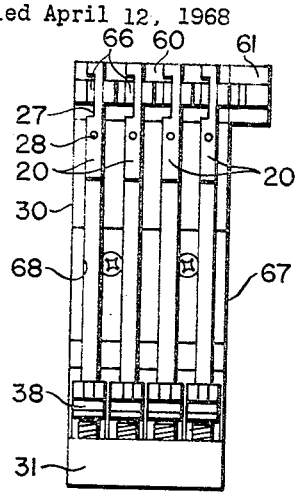

As is shown in FIG. 1 and FIG. 5 there are actually four hammers 20 mounted in frame assembly 10 together with four magnetically and electrically separated solenoid assemblies 32–34–36 and four actuating arms 38, one for each of the hammers 20. The number four, of course, is chosen for convenience only and a hammer mounting frame assembly may be made to include any number of hammers and actuating assemblies that may be desired.

The assembly 10 is attached to a mounting plate 50 by a pair of screws 51 and a locater bar 52. The plate 50 is part of the main frame of the printer.

As shown in FIG. 1 four print hammers 21 supported by frame assembly 12 are interspersed along the print line between the hammers 20 of assembly 10. In identical fashion a pair of opposed frame assemblies 14 and 16 support additional hammers 20 and 21 to continue the print line. Frame assemblies may be thus added to make up a print line of any desired length and number of print positions. All left-hand assemblies such as ten and fourteen are identical as are all right-hand assemblies such as 12 and 16. Left-hand and right-hand assemblies are basically identical and differ only in the shape of the hammers 20 and 21 and in the manner in which the top hammer guide inserts 60 and 64 are affixed to their respective assembly frames.

HAMMERS AND HAMMER GUIDES

As shown in FIG. 2, each left-hand frame assembly includes an upper hammer guide member 60 and a lower hammer guide member 67. Each right-hand frame assembly includes corresponding hammer guide members 64 and 69. The left-hand and right-hand lower guide members 67 and 69 are exactly identical to one another and the left-hand and right-hand members 60 and 64 are exactly identical in size and shape to one another but one is installed on its associated frame upside-down with respect to the other. The guide members are detachably connected to their respective frames for easy replacement and cleaning. They are constructed preferably of a low friction, wear resistent plastic such as "Teflon," "Delrin," "nylon," etc.

Each of the upper guide members 60 and 64 has a necked-down end portion whereby a system of interlocking slots and prongs is provided for the purpose of, first, properly positioning opposing frame assemblies with respect to one another, second, for guiding the hammers and third, for providing a top limit stop for the hammers. The lower hammer guides 67 and 69 are preferably constructed of the same type of plastic material and are provided with a series of vertically running hammer guide grooves described in further detail below.

Figure 4A:
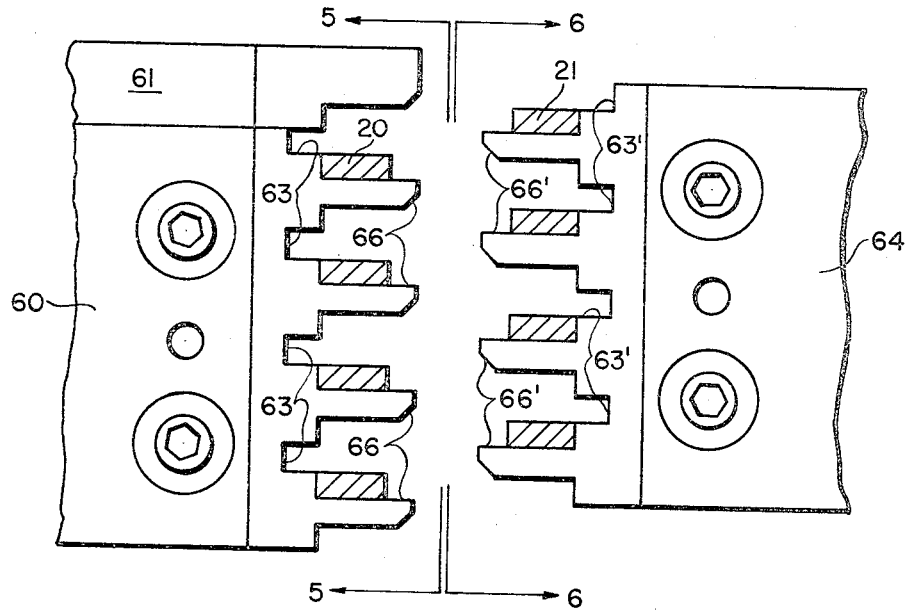
FIG. 4a is an enlarged plan view showing a pair of opposed frame assemblies prior to their being mated to align their hammers in print position.
Figure 4B:
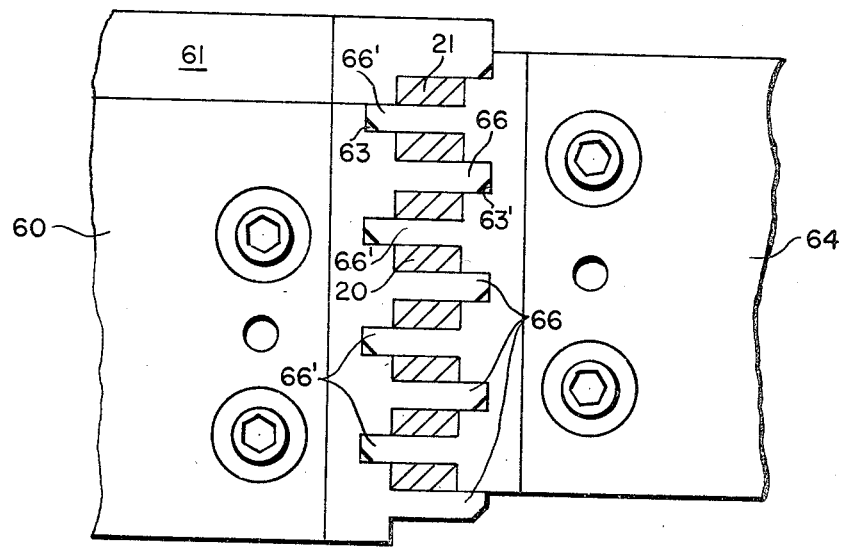
FIG. 4b is an enlarged plan view showing the frame assemblies of FIG. 4a mated in print position.

Referring now to FIGS. 4a and 4b, the top hammer guides 60 and 64 are hereinafter described in greater detail. As shown in FIG. 4a, wherein the two opposing frame assemblies 10 and 12 have been pulled apart and are in a non-operative relationship with one another, it is seen that the necked-down end portion of guide 60 includes four locating prongs 66 and four locating slots 63. Similarly, the necked-down end portion of guide 64 includes four locating prongs 66' and four locating slots 63'. A retaining guide member 61 is attached to the side of guide member 60 to retain and guide the end hammer 21.

As shown in FIG. 4b, when the two frame assemblies are mated to locate the hammers along the print line, the locating prongs 66 mate with the slots 63' and the prongs 66' mate with the slots 63. The space left between the prongs forms rectangular guide holes through which the necks of the hammers 20 and 21 pass. It is to be noted that in FIGS. 4a and 4b, for clarity, the tops of the hammers have been cut away to enable a clear view of the interlocking relationship between the guide members 60 and 64. It is highly advantageous that the hammer guide surfaces thus provided by the members 60 and 64 are as near as practicable to the record medium R (FIG. 2). This minimizes the lateral movement imparted to the hammer by the rotating drum at the instant of print impact and thus avoids the problem of the hammer binding in the guides.

Figure 3:
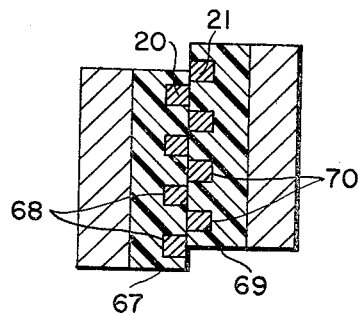
FIG. 3 is a cross-sectional view taken along the line 3—3 of FIG. 2.

The cooperation between lower guide members 67 and 69 is shown in FIG. 3 which is sectional view taken along the line 3—3 of FIG. 2. When the two opposing frame assemblies are in their operative position with respect to one another, the guide members 67 and 69 abut one another as shown. Guide 67 has three-sided vertical grooves 68 each of which contains in a loose sliding fit the stem of a print hammer 20. Guide 69 has similar grooves 70 each of which contains the stem of a print hammer 21. In each of the guide members the space between adjacent grooves is slightly greater than the width of a groove so that when the guides are abutting the exposed side of each hammer stem guides against the flat surface between two grooves of the adjacent guide member.

Figure 7:
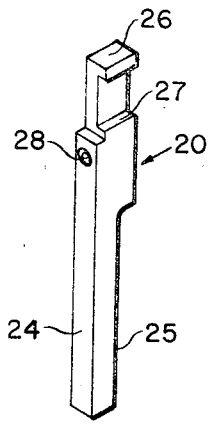
FIG. 7 is a perspective view of one of the print hammers of a left-hand hammer mounting frame assembly.
Figure 8:
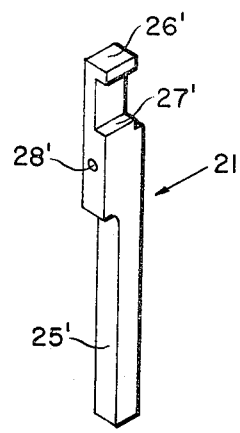
FIG. 8 is a perspective view of one of the print hammers of a right-hand hammer mounting frame assembly.

The hammers themselves are simply constructed one-piece hardened steel bars as shown in FIGS. 7 and 8. FIG. 7 shows a hammer 20 for use in a left-hand frame assembly such as 10 (FIG. 2) and FIG. 8 shows a hammer 21 for use in a right-hand frame assembly. The two hammers are constructed exactly the same except that the notches 27 and 27' are on opposite sides. The hammer 20 comprises a stem 24 essentially square in cross section which slides as described above in a groove 68 of lower guide number 67 (FIGS. 3 and 5). The lower end of stem 24 rests on top of actuating armature 38 (FIG. 2). The striking face 26 is symmetric about the vertical plane in which the rear face 25 of the stem lies. Notch 27 is provided in the side of the hammer to provide limit stop control and a through-hole 28 is provided to engage a wire return spring 65 (FIG. 2).

Figure 6:
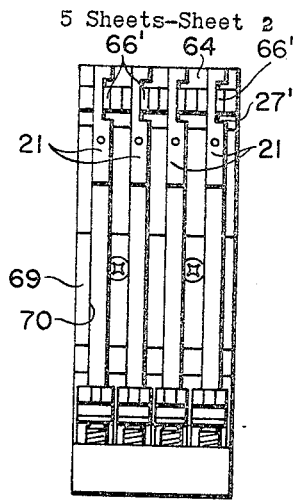

The hammer 20 fits into a left-hand assembly frame as shown in FIG. 5. To insert the hammer, it is necessary to lie the hammer into a groove 68 whereby the hammer notch 27 fits about a locating prong 66 and the end of the wire return spring projecting from the frame assembly fits into through-hole 28. The downward bias of the return spring keeps the hammer pressed against actuating arm 38 and retains the hammer in the assembly prior to the mating of two assemblies for operation. However, with very little force the hammers can be easily lifted out of the frame assembly, making hammer replacement and cleaning a very simple task. During operation the prong 66 functions as a top stop for the hammer. As shown in FIG. 6, a hammer 21 fits in the right-hand frame assembly in exactly the same way that the hammer 20 fits in the left-hand assembly except that the notch 27′ and coacting locating prong 66′ are positioned on the opposite side of the hammer. Just as the locating prongs 66 function as a limit stop to establish the maximum point of upward travel of hammers 20, locating prongs 66′ function as a limit stop for the hammers 21.

FIG. 2 shows the construction of the wire return spring assembly. A bar 62 is fastened to the top surface of frame 30 and supports four outwardly extending return springs 65 which lie in grooves in the top of frame 30. The right-hand ends of the springs project into the through-holes 28 of the hammers 20 as described above. To facilitate the insertion of the wire springs into the through-holes 28, one end of the through-hole is bevelled (FIG. 7).

After the opposing frame assemblies have been mounted in place, operation of the unit is as follows. When a selected character T on drum D is approaching the print line, the printer control electronics feeds an actuating pulse to the coils 34 and 36. This pivots arm 38 and propels hammer 20 against the record medium R to generate an impression of the selected character. Arm 38 is arrested by the under surface 71 (FIG. 2) of guide 67 before the hammer actually strikes the print couple. Printing is thus accomplished by the hammer under its own momentum and a truly ballistic strike is achieved. The locating prong 66, due to its cantilevered design, possesses a resiliency which provides a damping action to the hammer as it approaches the print surface. This prevents cutting of the paper when only single-part forms are being used. It also guards the drum surface against deformation if hammer actuation should occur when no paper is in the machine. After printing is completed the hammer returns to its rest position on arm 38, which has previously come to rest on its stop arm 42. Hammer return is achieved partly by the rebound of the hammer and partly by the action of spring 65.

Figure 9:
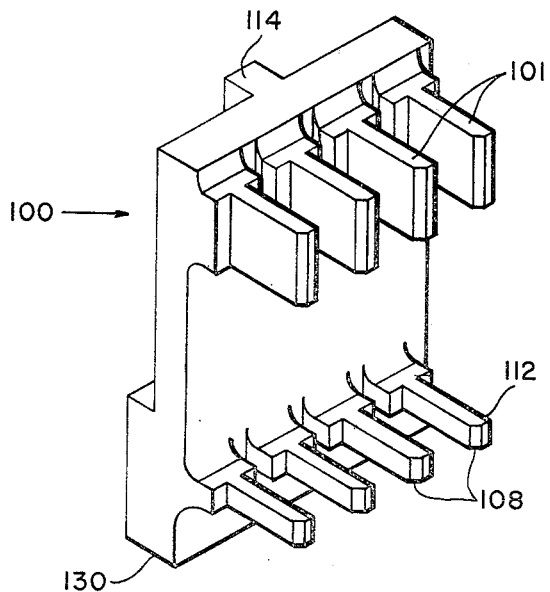
FIG. 9 is a perspective view of a modified form of hammer guide insert.

With reference now to FIGS. 9–12, a modified type of hammer guide insert is hereinafter described. FIG. 9 shows a single guide member 100. The member 100 is the same as upper guide member 60, previously described, except that it has a set of lower locating prongs 112 in addition to the upper prongs 101. This eliminates the need for a second separate guide member such as 67 (FIG. 2).

Figure 10:
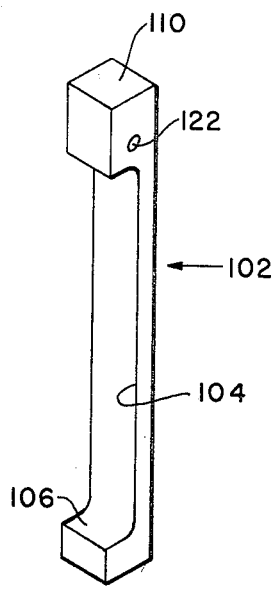
FIG. 10 is a perspective view of the hammer used with the modified guide insert of FIG. 9.

The hammer employed with the guide 100 is shown in FIG. 10. It is formed as a straight member 102 having an elongated side recess 104. The lower horizontal surface 106 is the "top stop" surface, functionally equivalent to the surface 27 of hammer 20 (FIG. 7). The lower surfaces 108 of the lower locating prongs 112 cooperate with the hammer surfaces 106 to establish the point of maximum upward excursion of the hammers. Of course, the top surface 110 is the impression striking surface. The hammer 102 is usable in either righthand or lefthand frame assemblies, eliminating the need for two separate types of hammers.

Owing to the cantilevered design of the lower prongs 112 the stop surfaces 108 are resilient so that, as with the prongs 66, damping of hammer motion will occur as the hammer approaches the surface of the type drum to prevent paper cutting and drum deformation.

As with the previously described guide 60, the guide 100 is preferably made of a durable and low-friction plastic such as "Teflon," "Delrin," or "nylon."

Figure 11:
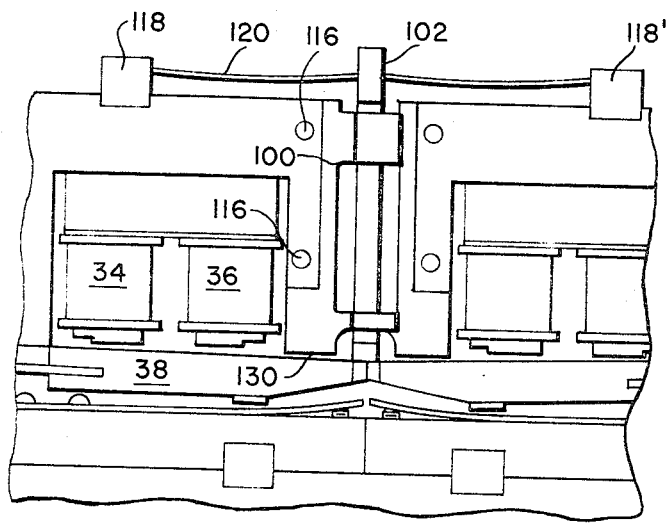
FIG. 11 is a side elevational view of a pair of hammer mounting frame assemblies employing the guide insert of FIG. 9, the two frame assemblies being shown in interlocked position for operation.

FIG. 11 illustrates the manner in which the guides 100 are attached to the hammer frame assemblies. A pair of dowel pins 116 are force fitted into holes in the frame and pass through holes in a ridge 114 (FIG. 9) extending out from the back surface of the guide 100, thus securing the guide to the frame. Each hammer 102 has a hole 122 (FIG. 10) into which a return spring 120 fits. The springs 120 are functionally identical to the springs 65 of the first embodiment. The springs 120 are affixed to blocks 118 and 118′ secured to the tops of the frame assemblies.

In all other respects the hammer frame assemblies shown in FIG. 11 are identical to those described in connection with FIG. 2. The hammer actuating arm 38 is drawn rapidly upwardly when solenoid coils 34 and 36 are energized, thereby propelling the hammer 102 against the print couple. The lower surface 130 of guide 100 arrests the arm 38 prior to the instant of the print strike to enable the hammer to print ballistically.

Figure 12A:
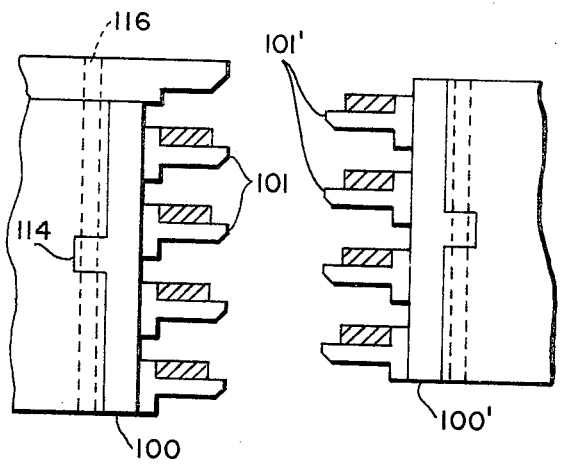
FIG. 12a is a partial plan view of the frame assemblies of FIG. 11, the two frames being in a disengaged, non-operative position and the hammer tops being cut away for clarity.
Figure 12B:
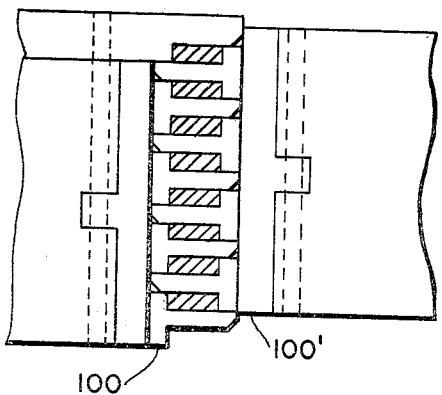
FIG. 12b is a partial plan view of the frame assemblies of FIG. 11 as shown in the interlocked, operative position.

FIGS. 12a and 12b are top views of the pair of frame assemblies shown in FIG. 11, the tops of the hammers 102 having been cut away to illustrate the manner in which the hammers nest between the locating prongs of the lefthand guide 100 and the prongs of the righthand guide 100′. When the frames are interlocked, FIG. 12b, the hammers are spaced along the print line by the two sets of prongs. Comparison with FIGS. 4a and 4b shows that the spacing and guiding principles of the first and second embodiments are identical.

In recapitlation, a hammer frame assembly includes all components, i.e. hammers, hammer actuating means and hammer guides, necessary for printing. The entire assembly is attachable to the printer frame by two screws 51 (FIG. 2), thus enabling easy assembly, maintenance and repair. The hammer guide members, such as 60, 67 and 100, associated with each frame assembly are inexpensive molded plastic inserts which are easily removable for replacement. The four hammers of the frame are held by the light bias of springs 65 (or 120) against the arms 38 such that when the frame assembly is detached from the opposite frame assembly removal of the hammers from the hammer guides for replacement or cleaning is a very simple matter.

Hammer mass is kept to a minimum since there are no large projections or appendages required on the hammer for guiding purposes and a simple notch in each hammer cooperating with a hammer guide locating prong functions as a top limit stop.

While the preferred embodiments have been described in connection with a rotating print carrier, it is readily apparent that a linearly moving (in the area of the print line) type carrier such as a chain or train may also be utilized with the hammer assembly of the invention. In fact, the principles of hammer guiding embodied in the described configurations are particularly suited to use with chain or train type carriers. This is because with this kind of carrier the forces imparted to the hammers by this kind of carrier during the instant of print impact are parallel to the print plane (plane in which the hammer shafts lie) rather than perpendicular thereto as in the case of a drum carrier. This exerts a sidewise force on the hammers. With both embodiments of the invention the upper guide prongs are positioned as nearly as possible to the print surface so that these sidewise forces on the hammer ends cannot cause any appreciable bending or cocking of the hammer and hammer binding and uneven guide wear are minimized. Further, the sidewise forces are applied to the guide surfaces of the upper prongs symmetrically about the print plane, whereby all torsion or twisting effects of these forces are eliminated.

It will be appreciated that various changes in the form and detail of the above-described preferred embodiments may be effected by persons of ordinary skill without departing from the true spirit and scope of the invention.

We claim:

1. A print hammer mounting device comprising, in combination:
   a first print hammer;
   a first hammer support frame for locating said first print hammer on a print line, said frame including means for slidably guiding said hammer and at least one locating slot;
   a second print hammer; and
   a second hammer support frame for locating said second print hammer on said print line, said second frame being on the opposite side of said print line from said first frame and including means for slidably guiding said second hammer and at least one locating prong extending between said hammers and adapted to mate with said locating slot, whereby said first and second hammers are located at adjacent print positions on said print line.

2. The device set forth in claim 1, further comprising:
   additional means for slidably guiding said first hammer including a first guide groove in said first frame engaging a portion of the surface of said first hammer, leaving a portion of said first hammer exposed; and
   a second guide groove in said second frame engaging a portion of the surface of said second hammer, leaving a portion of said second hammer exposed, whereby the exposed portion of said first hammer is adapted to guide on a surface of said second frame adjacent said second guide groove and the exposed portion of said second hammer is adapted to guide on a surface of said first frame adjacent said first guide groove.

3. The device set forth in claim 2, wherein:
   said guide surfaces and said print line are located in substantially the same plane.

4. The device set forth in claim 1, wherein:
   said means for slidably guiding said first hammer and said means for slidably guiding said second hammer comprise plastic members detachable from said first and second frames, respectively.

5. The device set forth in claim 2, wherein:
   said additional means for slidably guiding said first hammer and said additional means for slidably guiding said second hammer comprise plastic members detachable from said first and second frames, in combination.

6. A print hammer mounting device comprising, in combination:
   a first hammer support frame for locating a first print hammer on a print line, said frame being positioned on one side of said print line and including a first hammer guide groove engaging a portion of the surface of said first hammer, leaving a portion of said first hammer exposed; and
   a second hammer support frame for locating a second print hammer on said print line, said second frame being positioned on the other side of said line and including a second hammer guide groove engaging a portion of the surface of said second hammer, leaving a portion of said second hammer exposed;

whereby the exposed portion of said first hammer is adapted to guide on a surface of said second frame adjacent said second guide groove and the exposed portion of said second hammer is adapted to guide on a surface of said first frame adjacent said first guide groove.

7. The device set forth in claim 6, wherein:
   said guide surfaces and said print line are located in substantially the same plane.

8. The device set forth in claim 6, wherein:
   said first and second hammer guide grooves and adjacent guide surfaces are formed in first and second members detachable from said first and second frames, respectively.

9. The device set forth in claim 8 wherein said first hammer support frame further comprises:
   a hammer actuating arm adapted for engagement with said first print hammer;
   means for pivoting said actuating arm to slidably move said first hammer in said first guide groove; and
   a stop surface on said first member, said stop surface constructed and arranged to arrest said actuating arm, whereby said first hammer continues its sliding movement under its own momentum.

10. The device set forth in claim 9, further comprising:
    spring means connected between said first frame and said first hammer to bias said hammer against said actuating arm.

11. A device for mounting one or more print hammers in operative relation to a print line comprising, in combination:
    a first hammer support frame mounted adjacent to a plane projecting through said print line, said first frame including a first locating notch and a first locating prong;
    a second hammer support frame mounted on the side of said plane opposite said first frame, said second frame including a second locating notch and a second locating prong arranged to mate, respectively, with said first prong and said first notch; and
    a print hammer mounted between said prongs so as to be slidably guided thereby toward and away from said print line, said hammer including a shoulder cooperable with one of said prongs, whereby said prong functions as a limit stop to establish the point of maximum travel of said hammer.

12. The combination set forth in claim 11, further comprising:
    an additional locating notch in said first hammer support frame;
    an additional locating prong on said second hammer support frame, said additional prong arranged to mate with said additional notch; and
    a second print hammer mounted between said second prong and said additional prong so as to be slidably guided thereby toward and away from said print line.

13. The combination set forth in claim 12 wherein said second hammer includes:
    a shoulder cooperable with one of said prongs guiding said second hammer whereby said prong functions as a limit stop to establish the point of maximum travel of said second hammer.

References Cited

UNITED STATES PATENTS

| | | | |
|---|---|---|---|
| 2,787,210 | 4/1957 | Shepard | 101—93 |
| 3,306,191 | 2/1967 | Sharples | 101—93 |
| 3,385,211 | 5/1968 | Shepard | 101—93 |

WILLIAM B. PENN, Primary Examiner